(12) United States Patent
Weindorf et al.

(10) Patent No.: US 10,901,249 B2
(45) Date of Patent: Jan. 26, 2021

(54) DIMMABLE DISPLAY LENS SYSTEM

(71) Applicant: Visteon Global Technologies, Inc., Van Buren Township, MI (US)

(72) Inventors: Paul Fredrick Luther Weindorf, Novi, MI (US); Qais Sharif, Northville, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 191 days.

(21) Appl. No.: 16/057,903

(22) Filed: Aug. 8, 2018

(65) Prior Publication Data

US 2020/0050038 A1  Feb. 13, 2020

(51) Int. Cl.
*G02F 1/133* (2006.01)
*G02F 1/163* (2006.01)
*G02F 1/17* (2019.01)

(52) U.S. Cl.
CPC .......... *G02F 1/13318* (2013.01); *G02F 1/163* (2013.01); *G02F 1/172* (2013.01)

(58) Field of Classification Search
CPC ...... F16L 55/1651; F16L 55/18; B29C 63/36; E03F 2003/065
USPC ................. 359/237, 238, 265–275, 838, 900
See application file for complete search history.

(56) References Cited

U.S. PATENT DOCUMENTS

| | | | |
|---|---|---|---|
| 7,706,046 B2 * | 4/2010 | Bauer | H05K 1/0306 359/267 |
| 8,339,526 B2 | 12/2012 | Minikey, Jr. et al. | |
| 2016/0157324 A1 | 6/2016 | Weindort et al. | |
| 2018/0024409 A1 | 1/2018 | Yasumoto | |
| 2018/0074356 A1 | 3/2018 | Okuyama | |

FOREIGN PATENT DOCUMENTS

| | | |
|---|---|---|
| DE | 202018001210 U1 | 3/2018 |
| WO | 2008/063633 A2 | 5/2008 |
| WO | 2015/181340 A1 | 12/2015 |

* cited by examiner

*Primary Examiner* — Tuyen Tra
(74) *Attorney, Agent, or Firm* — Quinn IP Law (57) ABSTRACT

A dimmable display lens system and method is provided which includes a display element configured to emit light. The system and method also includes a dimmable lens disposed in the direction of light emission of the display element and configured to increase the transmission of light emitted by the display through the dimmable lens. The dimmable lens also includes a control system configured to increase the transmission of light emitted by the display according to a plurality of light transmission incremental steps. The control system includes a feedback control system configured to adjust the transmission of light through the dimmable lens based at least on the measured values of an ambient light sensor and a forward looking light sensor.

20 Claims, 12 Drawing Sheets

| STEP | T |
|---:|---:|
| 1 | 0.2 |
| 2 | 0.22987 |
| 3 | 0.264201 |
| 4 | 0.303659 |
| 5 | 0.34901 |
| 6 | 0.401135 |
| 7 | 0.461044 |
| 8 | 0.5299 |
| 9 | 0.60904 |
| 10 | 0.7 |

*FIG. 3*

| STEP | LWS | LOG(LWS) | T | DELTALOG | DELTALIN |
|---|---|---|---|---|---|
| 1 | 278.9458 | 2.44552 | 0.2 | 0.17272 | 136.2375 |
| 2 | 415.1833 | 2.61824 | 0.22987 | 0.17272 | 202.776 |
| 3 | 617.9593 | 2.79096 | 0.264201 | 0.17272 | 301.8121 |
| 4 | 919.7714 | 2.96368 | 0.303659 | 0.17272 | 449.2175 |
| 5 | 1368.989 | 3.1364 | 0.34901 | 0.17272 | 668.6158 |
| 6 | 2037.605 | 3.30912 | 0.401135 | 0.17272 | 995.1686 |
| 7 | 3032.773 | 3.48184 | 0.461044 | 0.17272 | 1481.21 |
| 8 | 4513.984 | 3.65456 | 0.5299 | 0.17272 | 2204.635 |
| 9 | 6718.619 | 3.82728 | 0.60904 | 0.17272 | 3281.381 |
| 10 | 10000 | 4 | 0.7 | | |

| STEP | LWS | LOG(LWS) | T | DELTALOG | DELTALIN |
|---|---|---|---|---|---|
| 1 | 511.4007 | 2.708761 | 0.2 | 0.162514 | 232.09 |
| 2 | 743.4906 | 2.871276 | 0.22987 | 0.159596 | 330.1801 |
| 3 | 1073.671 | 3.030871 | 0.264201 | 0.155969 | 463.9184 |
| 4 | 1537.589 | 3.18684 | 0.303659 | 0.151538 | 642.0208 |
| 5 | 2179.61 | 3.338379 | 0.34901 | 0.146235 | 872.594 |
| 6 | 3052.204 | 3.484614 | 0.401135 | 0.140039 | 1161.393 |
| 7 | 4213.597 | 3.624653 | 0.461044 | 0.133006 | 1509.863 |
| 8 | 5723.459 | 3.757659 | 0.5299 | 0.125273 | 1913.7 |
| 9 | 7637.16 | 3.882932 | 0.60904 | 0.117068 | 2362.84 |
| 10 | 10000 | 4 | 0.7 | | |

DIMMABLE DISPLAY LENS SYSTEM

BACKGROUND

Automotive displays can be used to provide visual information throughout a vehicle. These displays can be located in an instrument panel to provide information about the vehicle that a driver or operator may want to be aware of, such as speed, fuel/energy remaining, etc. Additionally, displays can be located in other parts of the vehicle, such as the center console, seat backs for entertainment, and interior and exterior surfaces of the vehicle doors. However, these displays may not always include viewable information, particularly when the vehicle is in an off state (i.e., low or no power in the vehicle).

SUMMARY

A dimmable display lens system is provided which includes a display element configured to emit light. A dimmable lens is disposed in the direction of light emission of the display element. The dimmable lens is configured to reduce the transmission of light emitted by the display through the dimmable lens. The dimmable lens includes a control system configured to reduce the transmission of light emitted by the display according to a plurality of light transmission reduction steps. The control system includes a control system configured to adjust the transmission of light through the dimmable lens based on at least a light sensor and a light source measuring light transmission through the dimmable lens.

A method is provided of controlling a dimmable display lens disposed in the direction of light emission of a display element, the method including setting the light emission of the display element to a constant value, generating a look up table containing a plurality of light transmission incremental steps using a minimum transmission level of the dimmable display lens, a maximum transmission level of the dimmable display lens, a predetermined number of light transmission incremental steps and a selected light transmission incremental step and adjusting the transmission of light emitted by the display element through the dimmable display lens according to the selected incremental step. The method may also include measuring ambient light to generate a transmission ratio lookup table and forward looking light to generate a luminance ratio table for transmission ratio table adaption control. The method may also include using a light source to project light through a segment of the dimmable display lens to a light sensor to measure the maximum transmission level via feedback control. The method may also include estimating the maximum transmission level or determining the maximum transmission level during startup of the dimmable display lens and the display element.

A non-transient computer readable medium containing program instructions for causing a computer to perform the method of setting the light emission of the display element to a constant value, generating a look up table containing a plurality of light transmission incremental steps using a minimum transmission level of the dimmable display lens, a maximum transmission level of the dimmable display lens, a predetermined number of light transmission incremental steps and a selected light transmission incremental step and adjusting the transmission of light emitted by the display element through the dimmable display lens according to the selected incremental step. The non-transient computer readable medium containing program instructions may also include the method of measuring ambient light to generate a transmission ratio lookup table and forward looking light to generate a luminance ratio table for transmission ratio table adaption control. The non-transient computer readable medium containing program instructions may also include the method of using a light source to project light through a segment of the dimmable display lens to a light sensor to measure the maximum transmission level. The non-transient computer readable medium containing program instructions may also include the method of estimating the maximum transmission level or determining the maximum transmission level during startup of the dimmable display lens and the display element.

BRIEF DESCRIPTION OF THE DRAWINGS

Further details, features and advantages of designs of the invention result from the following description of embodiment examples in reference to the associated drawings.

DETAILED DESCRIPTION

Recurring features are marked with identical reference numerals in the figures. A dimmable lens display system 10 is disclosed.

Automotive electronic displays (i.e., video screens), are increasingly common for use in the instrument cluster and/or for center stack displays. Additionally, automotive electronic displays are being employed in other areas of the automobile, such as doors, outside entry (e.g., keypads), rear seat entertainment and/or passenger entertainment applications. Often for styling (i.e., appearance), reasons it is desirable to have an electronic display hidden in a key-off (e.g., vehicle off), condition. This appearance is typically accomplished using a neutral density filter with a very low transmission value. However, the very low transmission value leads to very high display luminance values for a user to be able to see the electronic display images under high ambient light conditions. One approach to lower the display luminance is to use an anti-reflection coating. However, anti-reflection coatings are prone to highlight user fingerprints and therefore are typically not desirable from an appearance standpoint. Another approach is to use a dimmable lens in front of the electronic display. In this approach, in the key-off condition, the dimmable lens may be configured to be in a low transmission (dark) state. When in a key-on condition, the dimmable lens may be automatically adjusted for desired electronic display visibility with an objective to keep the dimmable lens as dark as possible.

One or more embodiments may be directed toward an electro-optical system and method to control the transmission of light through a dimmable lens element located in front of an electronic display. There are several types of dimmable lens elements (i.e., displays), such as, but not limited to, suspended particle devices (SPDs), electrochromic (EC) and dye-doped guest-host liquid crystal (LC) systems. These system typically require accurate control system (i.e., drivers), to control their transmission rates. One or more embodiments may use as an example the dye-doped LC system, though any of the other described systems and other display systems may be used.

Among other things, one or more embodiments may describe the use of a dimmable lens located in front of an electronic display to reduce the luminance of the electronic display, an automatic transmission control methodology, and an accurate dimmable lens transmission rate control using feedback control systems and methods.

Two exemplary embodiments are disclosed to address the situation that less electronic display luminance is required as the lens transmission is increased. The first embodiment is an optically bonded lens. The second embodiment is an air gap bonded lens. Each will be discussed in turn.

Figure 1A:
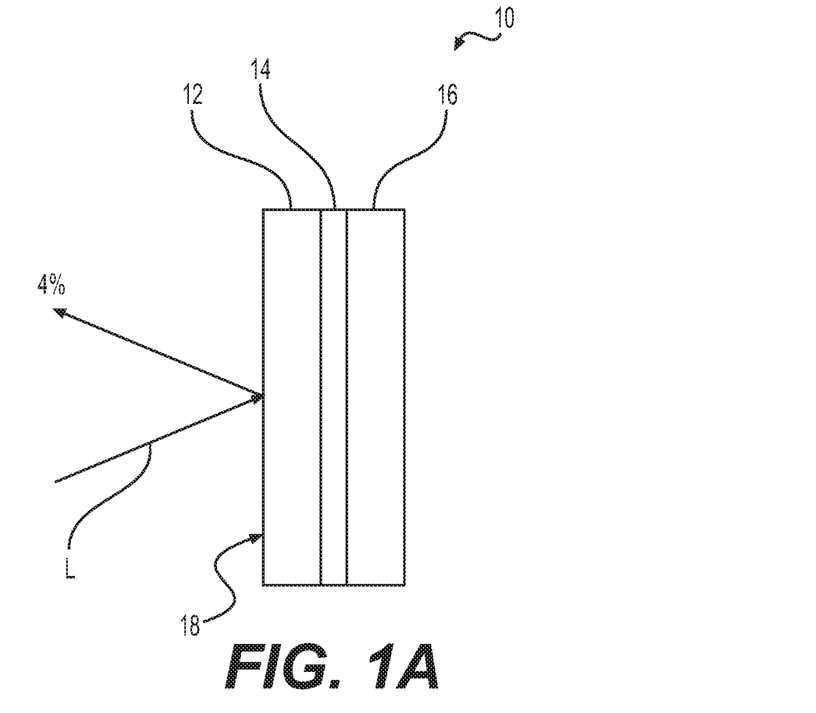
FIGS. 1A-1B are schematic views of an embodiment of the dimmable lens display system including an optically bonded dimmable lens and an embodiment of the dimmable lens display system including an air gap dimmable lens, respectively, in accordance with the present disclosure.

For the first embodiment, the optically bonded lens, a number of assumptions are made, including an optically bonded dimmable lens 12, a shiny front surface 18 at 4% reflectance, white shirt reflectance, and white shirt luminance at 10,000 nits. (A "nit" is a unit of visible light intensity, commonly used to specify the brightness of an electronic display. One nit is equivalent to one candela per square meter.)

FIG. 1A illustrates the first embodiment of a dimmable lens display system 10. The dimmable lens 12 is joined via an optical bond 14 to an electronic display 16. Light L is shown striking the dimmable lens 12, with 4% reflecting off of the shiny front surface 18 of the dimmable lens 12.

The Silverstein visibility function (developed by Dr. Louis D. Silverstein) relates the amount of required display luminance to the background luminance by the following equation:

$$ESL=B_O(DBL)^C$$

Where ESL represents the emitted symbol luminance in cd (candela)/m$^2$, $B_O$ represents the luminance offset constant, DBL represents the display background luminance in cd/m$^2$, and C represents the power constant (the slope of the power function in logarithmic coordinates).

The electronic display background luminance (BGL) that a user 28 (see e.g., FIG. 5) would see for the white shirt reflection from the shiny front surface of the dimmable lens 12 (see FIG. 1A) may be calculated using the following equation where 10K nits is an exemplary luminance of a white shirt when sunlight is shining on the white shirt:

$$BGL=10K \times 0.04=400 \text{ nits}.$$

Assuming no reflection due the optical bond 14, the required emitted display luminance (ESL) may be calculated using the following equation:

$$ESL=44.3 \times 400^{0.35}=360.6822 \text{ nits}.$$

Due to the optical bond 14 and the elimination of reflections behind the front of the dimmable lens 12, it is preferable to use a less opaque lens. For example, an electronic "normally-black" tinting system can be configured for different doping levels. Normally-black refers to a condition when no power is applied to the dimmable lens 12, the dimmable lens 12 defaults to its most opaque condition.

For example, a doping level may be selected for the most dynamic range of about Tint On=70% and Tint Off=20%. Operating the dimmable lens 12 at a 70% transmission results in reducing the thin film transistor (TFT) electronic display luminance compared to a 20% static transmission lens. The required emitted symbol luminance (ESL) values for Tint On and Tint Off are determined by dividing by the two transmission rates:

$$360/0.2=1800 \text{ nits; and}$$

$$360/0.7=515.26 \text{ nits}.$$

The calculated values above establish that the display luminance can be reduced by 1286 nits from 1800 nits to 515.26 nits if the dimmable lens 12 is utilized. If the lens transmission value T is used with the Silverstein visibility function (ESL=$B_O$(DBL)$^C$), a new equation is developed to calculate for the first embodiment where LD represents the display luminance alone, without the dimmable lens 12:

$$T \times LD=44.3 \times 400^{0.35}.$$

Figure 1B:
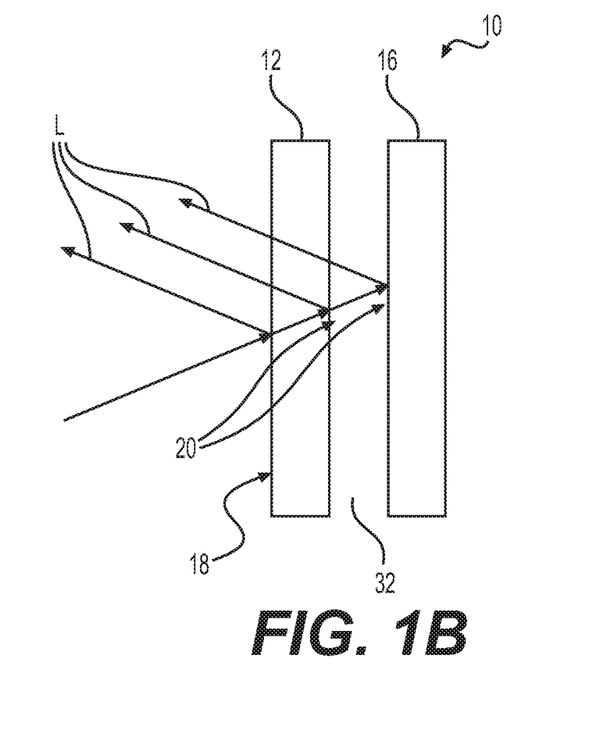

For the second embodiment, the dimmable lens 12 with an air gap 32, a number of assumptions are made, including a dimmable lens 12 with an air gap 32 with two 4% internal reflectance interfaces 20, a shiny front surface at 4% reflectance, white shirt reflectance, and white shirt luminance at 10,000 nits.

FIG. 1B illustrates the second embodiment of a dimmable lens display system 10. The dimmable lens 12 is situated with an air gap 32 separating the electronic display 16. Light L is shown striking the dimmable lens 12, with 4% reflecting off of the shiny front surface 18 and the two 4% internal reflectance interfaces 20.

The display background luminance (BGL) that the user 28 (see e.g., FIG. 5) would see for the white shirt reflection from the shiny front surface 18 of the dimmable lens 12 is calculated using the following equation:

$$BGL \approx 10K \times 0.04 + T^2 \times 0.08 \times 10K.$$

The required emitted display luminance (ESL) is calculated using the following equation:

$$ESL \approx 44.3[400+800T^2]^{0.35}$$

A new equation is developed to calculate the system performance for the second embodiment in terms of transmission T and display luminance LD:

$$T \times LD \approx 44.3[400+800T^2]^{0.35}$$

Figure 2:
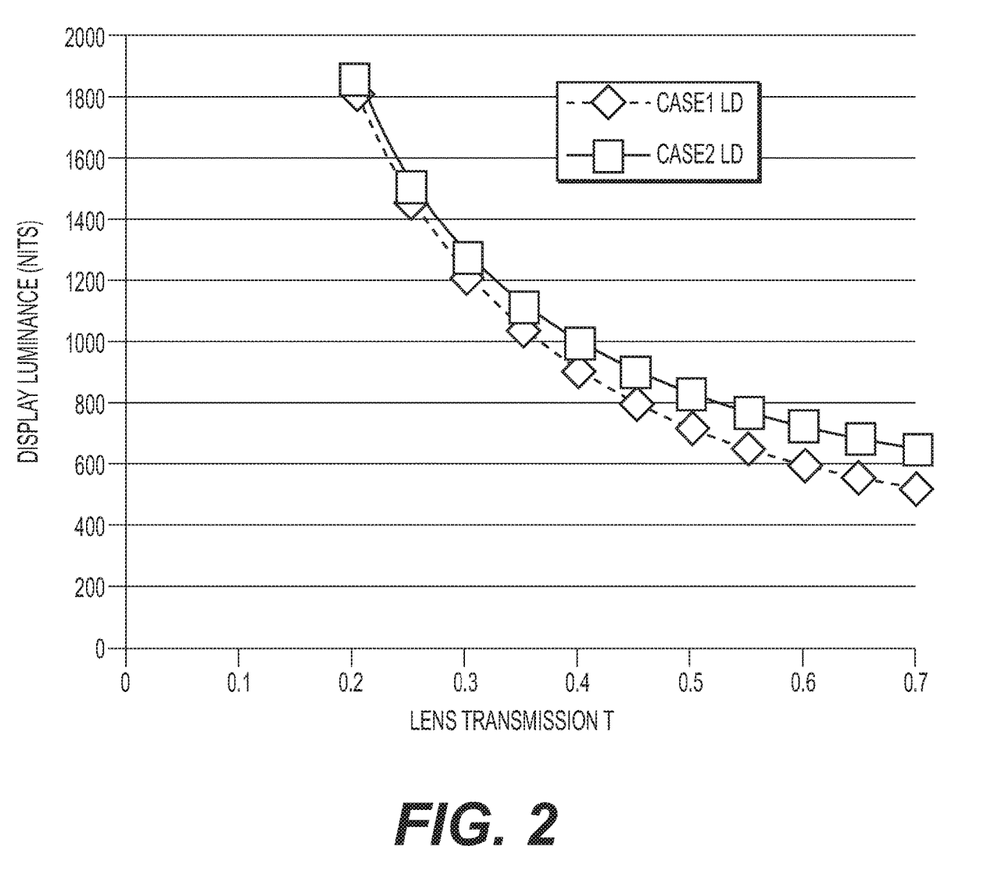
FIG. 2 is a chart plotting the level of lens transmission versus the display luminance of the embodiments of FIGS. 1A and 1B in accordance with the present disclosure.

The graph of FIG. 2 plots the required display luminance as a function of lens transmission for the first and second embodiments (as shown in FIGS. 1A and 1B). As the graph of FIG. 2 illustrates, the second embodiment requires more display luminance due to the air gap internal reflections. However, in both embodiments a lower lens transmission results in a lower required display luminance. Therefore, the dimmable lens 12 may be used to increase the lens transmission as a function of ambient lighting levels.

In order to operate either embodiment automatically, it is preferable that the display luminance is constant and the lens transmission level is adjusted for user visibility, with the exception at night when the display luminance may need to be reduced below the minimum luminance provided by the lens transmission rate at the display constant luminance value. As a result, the darkest dimmable lens 12 may be used for various ambient lighting conditions. Additionally, ratio changes in transmission level will appear to the user 28 (see e.g., FIG. 5) as equal steps due to the logarithmic nature of the eyes of the user 28. To develop automatic transmission control look-up tables, the following equation may be used to determine the transmissions as a function of the number of desired steps:

$$T_{SEL} = T_{MAX}/(T_{MAX}/T_{MIN})^{((Nt-N)/(Nt-1))}$$

Where $T_{SEL}$ represents the transmission of step number N, $T_{MAX}$ represents the maximum transmission level, $T_{MIN}$ represents the minimum transmission level, Nt represents the total number of steps, and N represents the selected step number.

Figure 3:
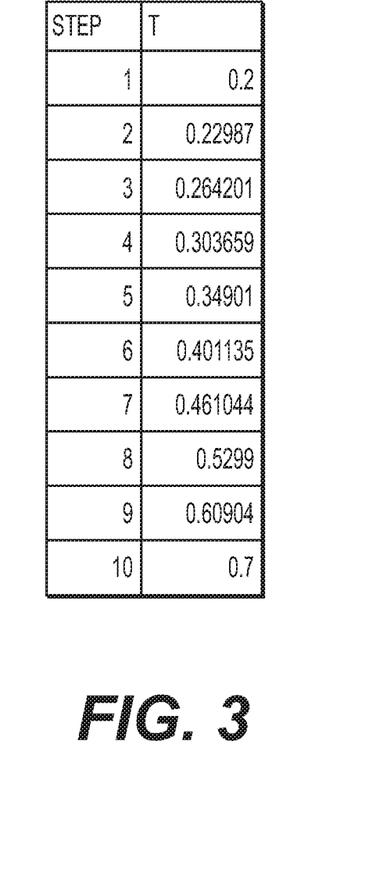
FIG. 3 is an exemplary constant ratio transmission step table in accordance with the present disclosure.

For example, if a 10-step look-up table is constructed, the above equation may be used to calculate the transmission levels for the various step numbers as shown in the table of FIG. 3. Note that the transmission ratio of successive steps (e.g., the ratio between step 2 and 3), is a constant value.

Figure 4:
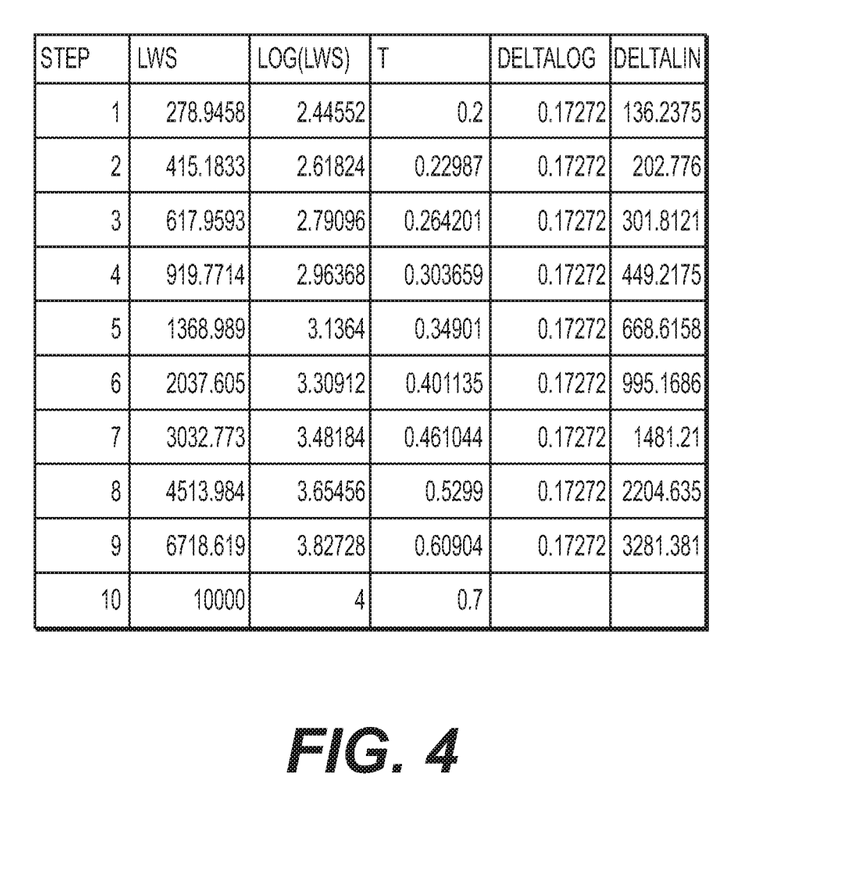
FIG. 4 is an exemplary automatic transmission control look-up table for the embodiment of FIG. 1A in accordance with the present disclosure.

The next step in generation of the automatic transmission control table is to calculate the ambient lamination value (e.g., white shirt luminance (LWS) value), that is proportional to a light sensor (see FIG. 4) output. For the first embodiment, this is accomplished by substituting LWS for 400 and 515.26 for LD in the earlier equation:

$$T \times LD = 44.3 \times 400^{0.35} \text{ and manipulating the equation to solve for } LWS:$$

$$LWS = [((T \times 515.26)/44.3))^{(1/0.35)}]/0.04.$$

The previous equation is used to calculate the white shirt luminance values for each of the 10 steps, as shown in FIG. 4.

As the ambient light sensor 26 output is directly proportional to the white shirt luminance (LWS), it is instructive to examine the difference in the LWS value between successive steps (e.g., between steps 2 and 3), as shown in the table of FIG. 4. The LWS difference is small for the lower steps (i.e., steps 1-4) and large for the upper steps (i.e., steps 7-10). For the lower steps, the small differences cause small analog/digital (A/D) converter differences which is not ideal from a resolution and/or noise perspective. In order to avoid these issues, it is preferable to use a logarithmic light sensor such as the OSRAM SFH 5711 by OSRAM Licht AG. If the logarithmic values of the LWS are calculated, the difference between successive logarithmic values becomes a constant as shown in the chart of FIG. 4. Using the logarithmic values results in equal A/D converter differences and avoids the earlier issues described above with a linear light sensor.

Figure 6:
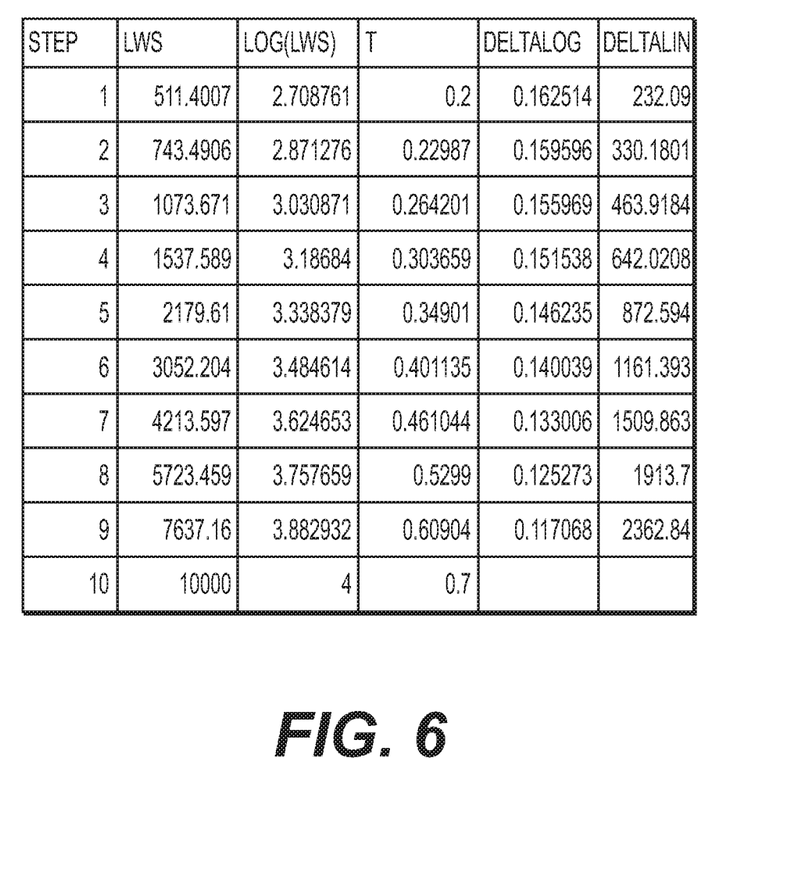
FIG. 6 is an exemplary automatic transmission control look-up table for the embodiment of FIG. 1B in accordance with the present disclosure.

For the second embodiment, a similar process used for the first embodiment can be used, including the calculation of the white shirt luminance (LWS) using a modified equation for the second embodiment:

$$LWS \approx [((T \times 654.4244)/44.3))^{(1/0.35)}]/(0.04+0.08 \times T^2).$$

A similar table may be generated for the second embodiment, as shown in FIG. 6. In this second embodiment, the difference between successive steps for the logarithmic value is no longer constant (unlike for the first embodiment), but regardless it is still preferable to use the non-constant logarithmic values than the linear LWS values. As a result, the use of a logarithmic light sensor (such as, but not limited to, the OSRAM SFH 5711) is preferable to a linear light sensor.

Figure 5:
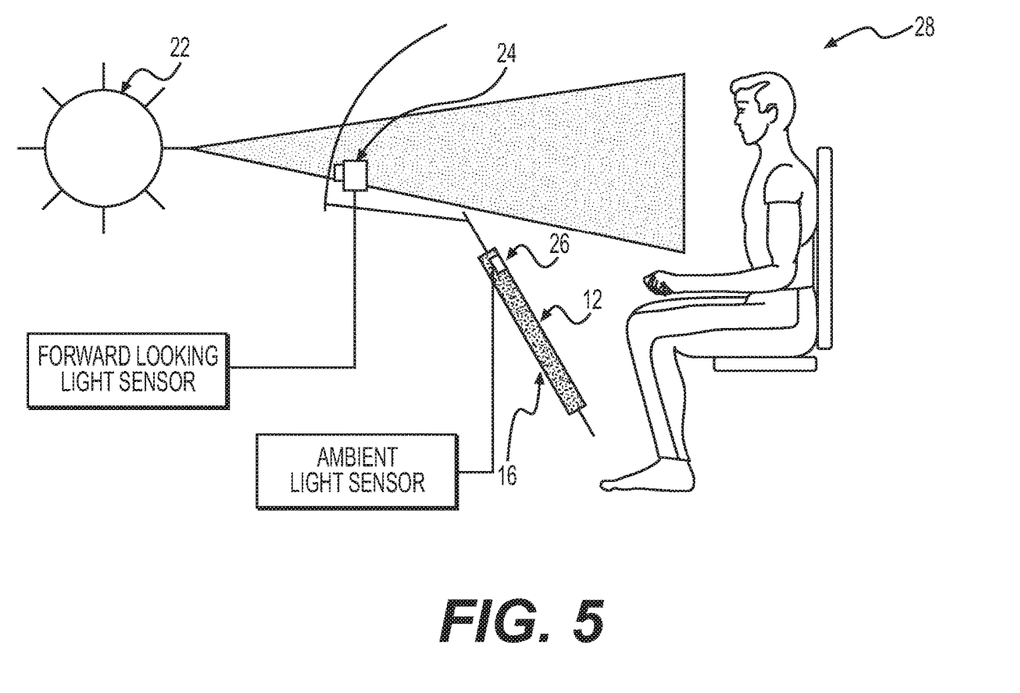
FIG. 5 is a schematic view of an embodiment of a dimmable lens display system disposed in an automobile in accordance with the present disclosure.

The final step is to acknowledge that the Silverstein equation only takes into consideration the reflected background luminance. However, it is also necessary to consider the forward looking luminance, particularly in the automotive situation (as well as other situations). In addition to increasing the display luminance as a function of the reflected display background luminance measured by the ambient light sensor 26, the visibility performance of the display may be further improved by including a forward looking light sensor 24 which may remotely located (as shown in FIG. 5) to compensate for conditions of transient adaption or eye adaption mismatch as a result of the user 28 looking back and forth from the exterior of the automobile to the electronic display.

Figure 7:
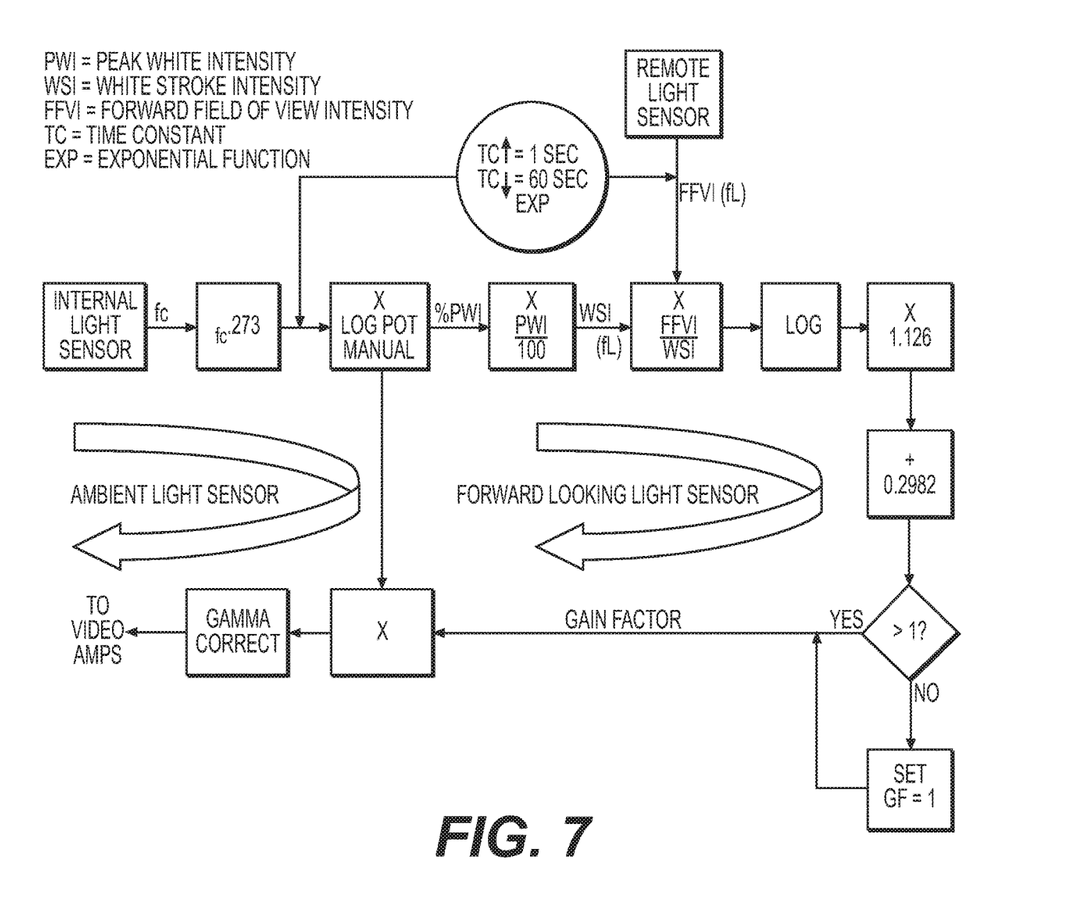
FIG. 7 is a block diagram of an automatic display luminance system.
Figure 8A:
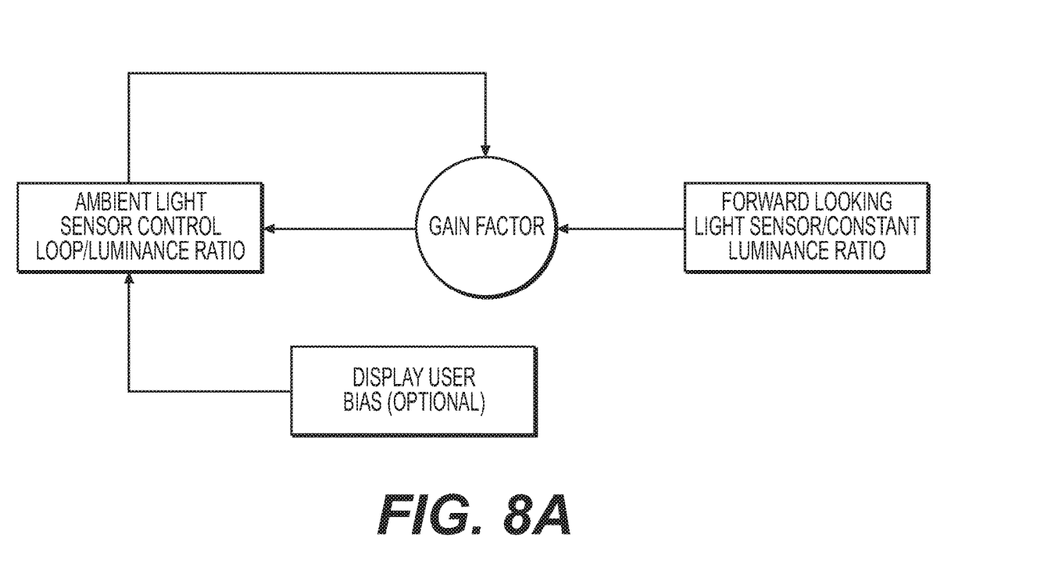
FIG. 8A is an exemplary block diagram of an automatic luminance control system using logarithmic light sensors in accordance with the present disclosure.
Figure 8B:
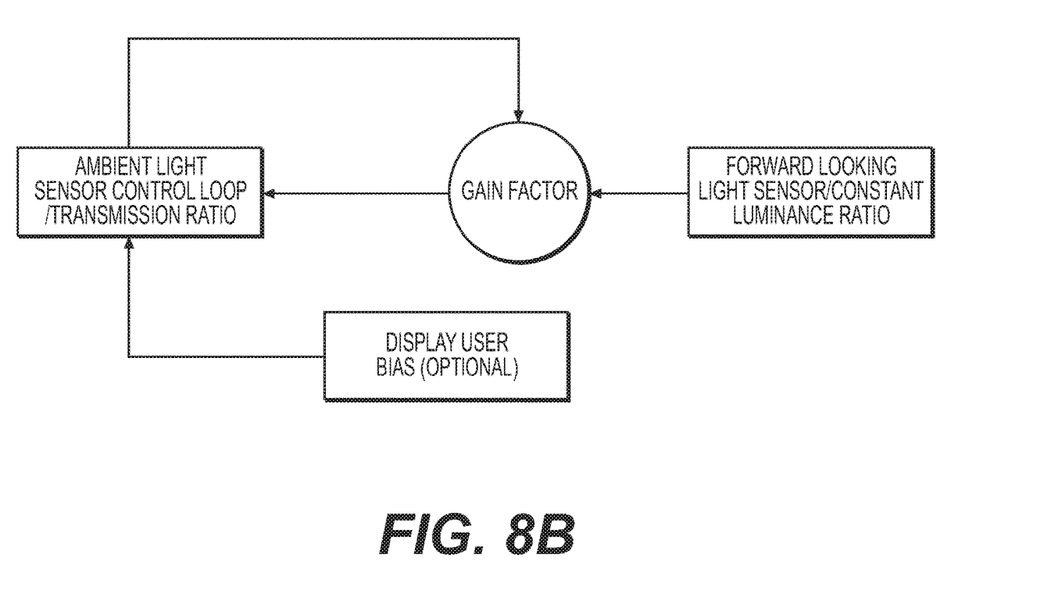
FIG. 8B is an exemplary block diagram of an automatic dimming control system using logarithmic light sensors in accordance with the present disclosure.

An implementation of the system (see e.g., FIGS. 5 and 7), but using logarithmic light sensors (i.e., forward looking and ambient), (such as the OSRAM SFH 5711) in place of linear light sensors is shown in FIG. 7. However, the implementation shown in FIG. 7 accomplishes automatic luminance control where the display luminance is changed as a function of the lighting conditions rather than holding the display luminance constant and changing the transmission of the dimmable lens 12. The implementation of the system shown in FIG. 8A may be modified to adjust the transmission rather than the display luminance and is illustrated in FIG. 8B. For both implementations, the user/driver 28 may select a bias by a selected number of luminance ratios (see FIG. 8A) or transmission ratios (see FIG. 8B).

In order to accurately control the transmission level of the dimmable lens 12, a feedback method is required. The operational curve of the LC cell forming the dimmable lens 12 shifts substantially over automotive operational temperature ranges (e.g., winter and summer climates). The LC cell must be driven AC (alternating current) in order to prevent charge migration to one of the LC cell's internal surfaces. One embodiment to drive the LC cell may use two microprocessor counter outputs to generate the drive voltages to the final differential driving transistors. For example, the peak-to-peak voltage may be controlled by the voltage source via a potentiometer circuit, however a PWM (pulse width modulator) output from a microprocessor with an interface circuit(s).

The embodiments provided herein for transmissive feedback dimming are only exemplary and not limiting. The transmissive active dimming disclosed herein may be applied to any optical structure capable of the dimming function.

While one or more embodiments may utilize a guest-host LC cell, other configurations capable of the dimming function may also be utilized. The transfer function of the LC cell is known to be fairly steep and varies with temperature. Since the transmission rate varies significantly with temperature and LC cell-to-cell variation, a feedback control mechanism is required to maintain precise control of the transmission rate of the LC cell (i.e., dimmable lens 12).

Figure 9A:
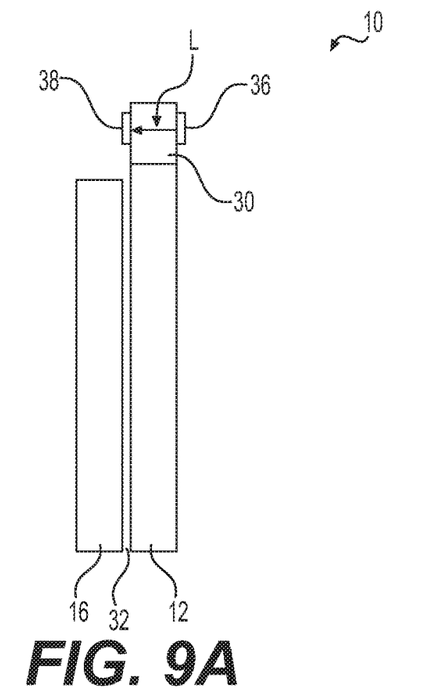
FIG. 9A is a perspective view of an embodiment of a dimmable lens display system in accordance with the present disclosure.

Referring now to FIG. 9A, a transmission based system is shown. A transmission rate light source 36, such as, but not limited to, a light emitting diode (LED) is disposed on the exterior surface of the dimmable lens 12. The transmission rate light source 36 is configured to emit light L through the dimmable lens 12 toward a transmission rate light sensor 38. The transmission rate light source 36 can include visible and/or invisible spectral radiation LEDs, for example. A separate segment 30 of dimmable lens 12 is disposed adjacent to the transmission rate light source 36 and the transmission rate light sensor 38. The separate segment 30 is used to provide the control system of the dimmable display lens system 10 with the maximum and operational transmission rates of the dimmable lens 12 using the transmission rate light source 36 and/or the transmission rate light sensor 38.

Figure 9B:
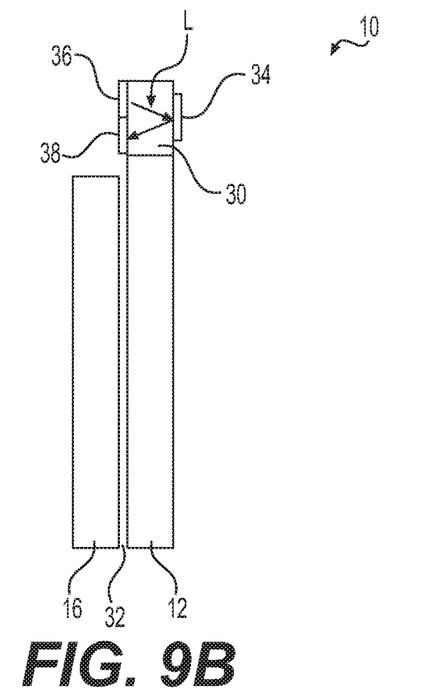
FIG. 9B is a perspective view of an alternative embodiment of a dimmable lens display system in accordance with the present disclosure.

FIG. 9B illustrates a reflection based control system. The transmission rate light source 36 is disposed on the interior surface of the dimmable lens 12, on the same side that is facing the display 16. The air gap 32 is disposed between the dimmable lens 12 and the display 16. The transmission rate light source 36 is configured to emit light L through the dimmable lens 12 to a reflector 34 disposed on the opposite (i.e., exterior), side of the dimmable lens 12. The light L emitted by the transmission rate light source 36 reflects off of the reflector 34 and back through the dimmable lens 12 to the transmission rate light sensor 38, which is disposed adjacent to the transmission rate light source 36. According to one or more embodiments, the separate segment 30 (see FIGS. 9A-9D) may be omitted, with the maximum and operational transmission rates being determined and/or estimated by the control system of the dimmable display lens system 10.

Figure 9C:
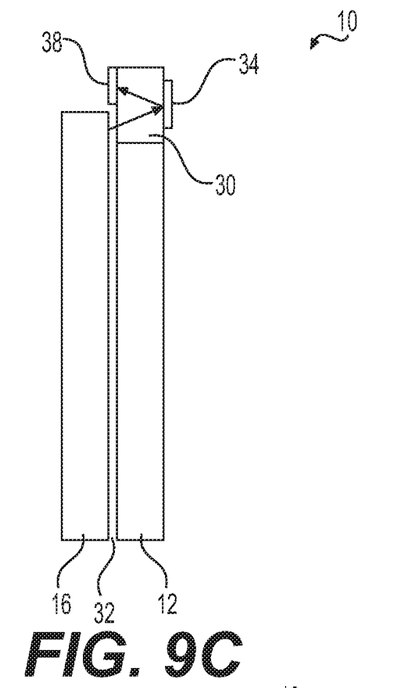
FIG. 9C is a perspective view of an alternative embodiment of a dimmable lens display system in accordance with the present disclosure.
Figure 9D:
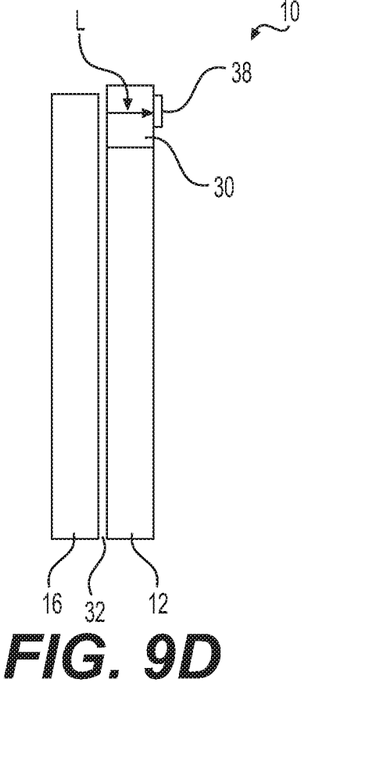
FIG. 9D is a perspective view of an alternative embodiment of a dimmable lens display system in accordance with the present disclosure.

FIGS. 9C-9D illustrate using the luminance from the dimmable lens 12 to determine the transmission rate. FIGS. 9C-9D generally illustrate the dimmable lens 12 with the air gap 32 disposed between the dimmable lens 12 and the display 16. In the embodiments shown in FIGS. 9C-9D, the control system of the dimmable lens display system 10 utilizes the luminance from the display 16 to determine the transmission rate of the dimmable lens 12.

In FIG. 9C, the separate segment 30 is disposed to overlap a portion of the output (i.e., luminance), area of the display 16. It should be understood that the portion of the output area of the display 16 may or may not be visible to the driver/user/operator 28 of the vehicle. A unique output may be used (i.e., a test pattern), that the control system of the dimmable lens display system 10 uses to determine the transmission rate of the dimmable lens 12. In other embodiments, the portion of the output area of the display 16 includes the viewable area. The light L from the display 16 (rather than from an independent transmission rate light source 36 as in FIGS. 9A-9B passes through the dimmable lens 12 and is reflected by the reflector 34 to the transmission rate light sensor 38 disposed on the dimmable lens 12 on the opposite side of the reflector 34. The transmission rate light sensor 38 can be disposed within the air gap 32 between the dimmable lens 12 and the display 16.

In FIG. 9D, the separate segment 30 is disposed to overlap a portion of the output area of the display 16. As discussed above, the separate segment 30 may include a unique output from display 16 and/or a portion of the viewable output from the display 16. For example, a bezel or surround (not shown) may at least partially conceal the separate segment 30 and/or the transmission rate light sensor 38 from the viewer. The light L from the display 16 passes through the separate segment 30 of the dimmable lens 12 to the transmission rate light sensor 38 disposed on the opposite side of the dimmable lens 12. In both FIGS. 9C-9D, the control system of the dimmable display lens system 10 utilizes the luminance output of the display 16 to determine the transmission rate of the dimmable lens 12.

Figure 10:
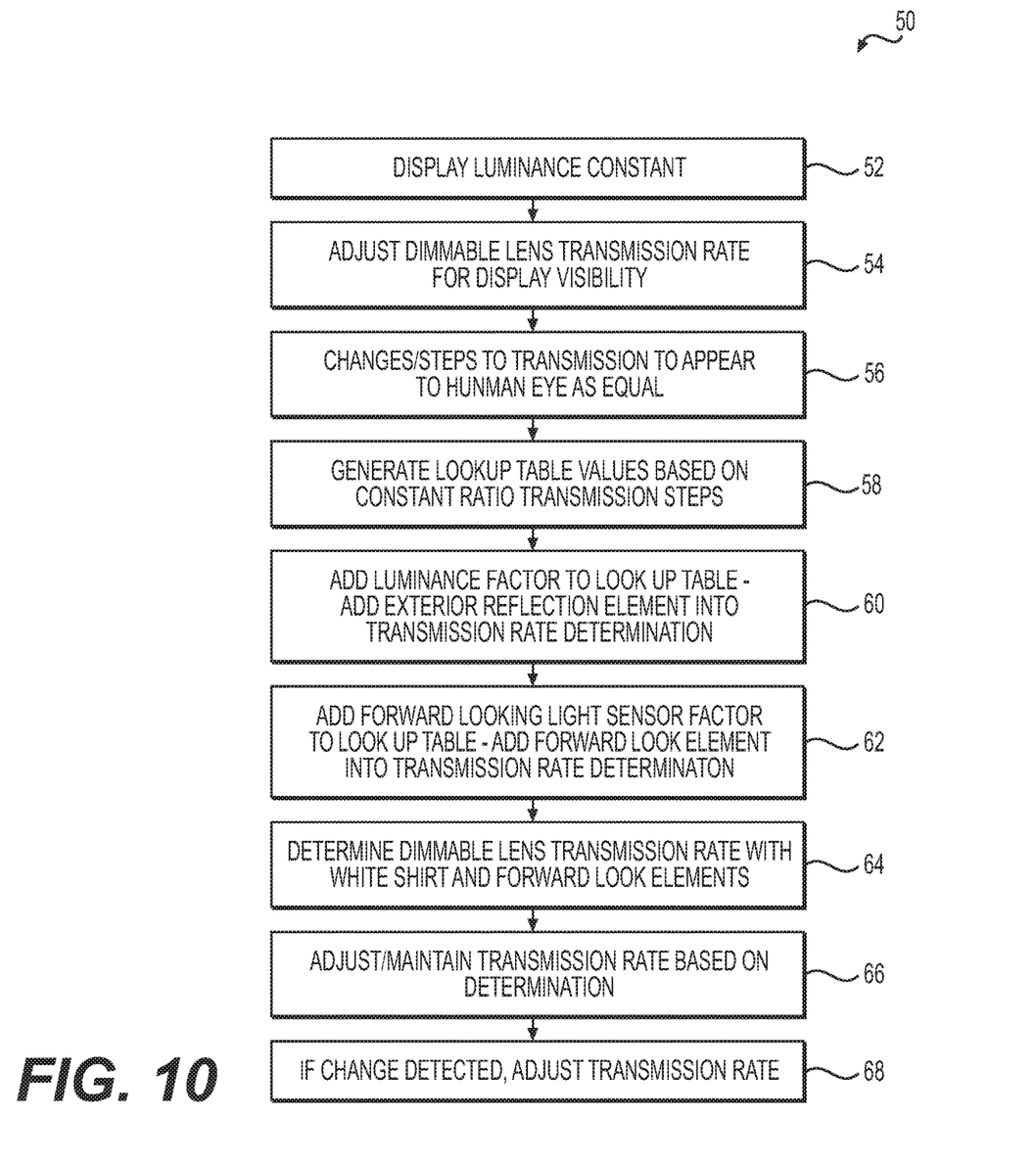
FIG. 10 is a block diagram of a luminance control system of a dimmable lens display system in accordance with the present disclosure.

FIG. 10 generally illustrates a block diagram of the automatic dimming lens control system 50 for the dimmable display lens system 10. The automatic dimming lens control system 50 is configured in block 52 such that the luminance of the display 16 is constant and the transmission rate of the dimmable lens 12 is automatically adjusted to a predetermined visibility level in block 54. For example, the darkest setting (i.e., lowest transmission rate), for dimmable lens 12 can be used for low ambient light conditions (i.e., nighttime). Once the minimum output luminance is obtained at the lowest dimmable lens transmission rate, the constant display luminance may be reduced further to obtain reductions in the display luminance for night time conditions.

In block 56, the automatic dimming lens control system 50 is configured to adjust the transmission rate of the dimmable lens 12 in steps that appear equal to the human eye. However, as the human eye is not capable of perceiving linear steps as equal, a constant transmission step table can be used that will be perceived by the human eye as linear. Additionally and alternatively, other step configurations can be used, such as non-linear, arbitrary, random, or based on a predetermined function.

In block 58, the automatic dimming lens control system 50 generates, for example, a stepped constant ratio transmission rate look up table where the transmission rate is selected based on the ambient and forward looking logarithmic light sensors. The number of steps can vary, but for example, ten steps can be used to move from a transmission rate of 0.2 to 0.7, with 0.2 indicating the lowest amount of light transmission from display 16 through dimmable lens 12. Due the constant step ratio nature of the look up table, adjustments to the transmission rate of the dimmable lens 12 by the automatic dimming lens control system 50 appear to a human viewer to be of equal value (i.e., linear), even though mathematically the values of each step are constant ratios and not linear. By changing the transmission rate of the dimmable lens 12 according to constant ratio transmission steps, the viewer will not perceive a sudden or shocking change to the luminance of the display 16 when viewed through the dimmable lens 12.

In block 60, an additional factor is added to the determination of the transmission rate by the automatic dimming lens control system 50. The luminance of ambient light reflections is measured using the ambient light sensor 26 that may be logarithmic. The luminance is a factor in determining the transmission rate of dimmable lens 12 by the automatic dimming lens control system 50 due the light reflected back from the dimmable lens 12 from an exemplary lightly colored surface, such as lightly-colored leather seats in the vehicle. This reflected luminance impacts the visibility of the display 16 through the dimmable lens 12 by a viewer. For example the viewer, such as a driver 28, in bright sunlight can reflect a high level of light toward the dimmable lens 12. The transmission rate of the dimmable lens 12 is then adjusted to compensate for the ambient light reflected onto the dimmable lens 12. The resulting higher transmission step for the dimmable lens 12 allows more light to pass through from the display 16 to the viewer to overcome the "glare" reflected to the driver/viewer 28.

In block 62, an additional factor is added to the determination of the transmission rate by the automatic dimming lens control system 50. A forward looking light sensor 24 (see FIG. 6), that may be logarithmic, is configured to compensate the transmission rate of the dimmable lens 12 for the viewer temporary eye adaptation or discrepancies in human eye adaptation. For example, the viewer may be looking at a high luminance/reflectivity object (e.g., the sun, oncoming headlights), due to the limitations of the human eye, adjustments by the viewer to perceive a lower luminance display 16 with the dimmable lens 12 can be problematic. However, by using the forward looking light sensor 24, the automatic dimming lens control system 50 compensates for this situation and adjusts the transmission rate of the dimmable lens 12 accordingly. Using the previous example, the automatic dimming lens control system 50 adjusts the transmission rate of the dimmable lens 12 to a higher value, resulting in less of a dimming effect, so that the viewer can perceive the display 16 despite the high luminance/reflectively object impacting the vision of the viewer.

In block 64, the automatic dimming lens control system 50 determines the transmission rate of the dimmable lens 12 by processing the predetermined transmission rate of the dimmable lens 12 (e.g., on vehicle startup), and factoring in the ambient reflection and forward look values. For example, if the original transmission rate for the dimmable lens is 0.2 (the display 16 is relatively dim to the viewer), but the ambient reflection and/or forward look values impact (i.e., revise), the transmission rate look up table values, then the new transmission rate for the dimmable lens 12 is a value corresponding to a higher transmission rate such as 0.3 (the display 16 is brighter relative to the viewer).

In block 66, the automatic dimming lens control system 50 adjusts the transmission rate of the dimmable lens 12 according to the determination in block 64.

In block 68, the automatic dimming lens control system 50 adjusts the dimmable lens 12 transmission rate according to the updated look up table, including the initial transmission rate value and any changes due to measurements of the ambient reflection sensor 26 and forward looking light sensor 24, if any. If there are no changes required (i.e., the initial (or present) value is confirmed by the look up table), then the automatic dimming lens control system 50 maintains the present value of the dimmable lens 12 transmission rate. If there are changes required (i.e., the initial/present value is different than the revised look up table indicates), then the automatic dimming lens control system 50 adjusts the dimmable lens 12 transmission rate accordingly.

Figure 11:
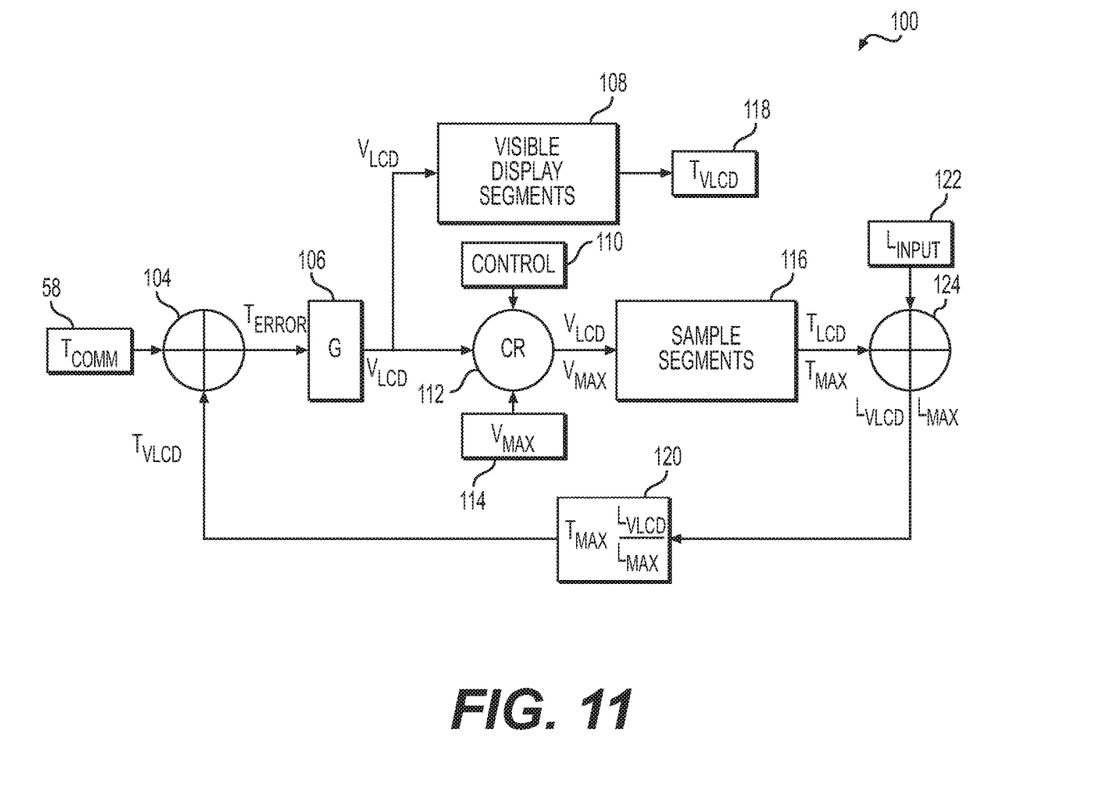
FIG. 11 is a block diagram of a dimming feedback control system of the dimmable lens display system in accordance with the present disclosure.

The automatic dimming lens control system 50 also includes a feedback control system 100. The feedback control system 100 is required due to the operational temperature ranges of the display 16 located in a vehicle. In order to maintain precise control of the transmission rate of the dimmable lens 12, the feedback control system 100 compensates for changes in transmission versus voltage of the dimmable lens 12 over the transmission rate range and the aforementioned temperature impact on the dimmable lens 12.

The voltage of the dimmable lens 12 is adjusted to control the effective transmission rate using the feedback control system 100. According to one or more embodiments, the feedback control system 100 includes a digital proportional-integral-derivative (PID) loop, an analog loop, or a combination of both.

As generally illustrated in FIG. 11, the feedback control loop to accurately control the transmission rate value of the dimmable lens 12 begins at block 112. The block 112 is configured to either apply the voltage VLCD of the display 16 or the maximum voltage VMAX of the display 16 to the separate segment 30 (see FIGS. 9A-9D) in an alternating fashion. The block 116 generates the transmission rate of a transfer function of the dimmable lens 12 in the sample segment 30. As the voltage (i.e., VLCD or VMAX), of the dimmable lens 12 is applied to separate segment 30, the luminance transmission from the transmission rate light source 36 is measured by the transmission rate light sensor 38 in front of the separate segment 30. When the maximum voltage is applied to the separate segment 30 of the dimmable lens 12, the luminance transmission from the transmission rate light source 36 is also measured by the transmission rate light sensor 38 in front of the separate segment 30. The block 124 receives input of the luminance value 122 of the transmission rate light source 36 and outputs the maximum luminance LMAX at maximum voltage VMAX and the luminance measured at the predetermined voltage LVLCD. In block 120, the actual dimmable lens 12 transmission value is calculated by multiplying the maximum transmission rate TMAX by the ratio between the measured luminance LVLCD of the dimmable lens 12 and the maximum luminance LMAX of the dimmable lens 12. By comparing the feedback transmission rate to the desired transmission rate, a transmission rate error TError is determined by block 104 by subtracting the desired transmission rate TCommand from the feedback transmission rate TVLCD. For example, if a higher transmission rate is requested by the automatic dimming lens control system 50, the transmission rate error increases and the luminance of the dimmable lens 12 increases. In other words, a proportion of the TError is added back to the TCommand value. As a result, the transmission rate calculation increases in block 120. The same display 16 voltage VLCD is also used by block 108 to drive segments of the display 16 that are visible to the viewer and implement the desired transmission rate on those areas of the display 16.

According to one or more embodiments, the use of the separate segments 30 for determining the transmission rate can provide a more accurate feedback control loop, omitting the separate segments 30 can still provide a functional and less complex feedback control loop configuration. Sampling the maximum luminance of the transmission rate light source 36 during power up (i.e., activation), and using the maximum luminance value as a default value for the remainder of the activation cycle. If during the activation cycle the maximum luminance of the transmission rate light source 36 is commanded by the user 28 or by the automatic dimming lens control system 50, the most recent maximum luminance sample can be used by the feedback control loop for the remainder of the activation cycle.

Many modifications and variations of the present invention are possible in light of the above teachings and may be practiced otherwise than as specifically described while within the scope of the appended claims.

What is claimed is:

1. A dimmable display lens system, the system comprising:
   a display element, the display element configured to emit light; and
   a dimmable lens, the dimmable lens disposed in the direction of light emission of the display element and configured to increase the transmission of light emitted by the display element through the dimmable lens, wherein the dimmable lens includes a control system configured to adjust the transmission of light emitted by the display through the dimmable lens according to a look up table containing a plurality of light transmission incremental steps, wherein the control system includes a feedback control system configured to adjust the transmission of light through the dimmable lens based at least on the measured values of an ambient light sensor and a forward looking light sensor.

2. The dimmable display lens system of claim 1, wherein the dimmable lens is further disposed to the display element by either optical bond or an air gap between the dimmable lens and the display element.

3. The dimmable display lens system of claim 1, wherein the display element emits a plurality of levels of display luminance.

4. The dimmable display lens system of claim 1, wherein the plurality of light transmission incremental steps in the look up table of the control system are spaced according to a predetermined ratio, wherein the predetermined ratio is determined using at least a minimum transmission level of the dimmable display lens and a maximum transmission level of the dimmable display lens.

5. The dimmable display lens system of claim 1, wherein the dimmable lens is at least one of an active polarizer device, a suspended particle device, an electrochromic device, or a dye-doped guest-host liquid crystal device.

6. The dimmable display lens system of claim 1, wherein the control system includes a light source disposed on the dimmable lens, opposite of the display element, and the light sensor, disposed on a same side of the dimmable lens as the display element, the light sensor configured to receive light emitted by the light source through the dimmable lens to determine the transmissivity of the dimmable lens.

7. The dimmable display lens system of claim 1, wherein the control system includes a light source and a light sensor disposed on a same side of the dimmable lens as the display element, and a reflector disposed on an opposite side of the dimmable lens, the reflector configured to reflect light emitted by the light source through the dimmable lens to the light sensor to determine the transmissivity of the dimmable lens.

8. The dimmable display lens system of claim 1, wherein the control system includes a light sensor disposed on a same side of the dimmable lens as the display element, and a reflector disposed on an opposite side of the dimmable lens, the reflector configured to reflect light emitted by the display element to the light sensor to determine the transmissivity of the dimmable lens.

9. The dimmable display lens system of claim 1, wherein the control system includes a light sensor disposed on an opposite side of the dimmable lens as the display element, the light sensor configured to receive light emitted by the display element through the dimmable lens to determine the transmissivity of the dimmable lens.

10. The dimmable display lens system of claim 1, wherein the control system includes a proportional integral derivative (PID) controller, the PID controller configured to adjust the voltage of the dimmable display to change a light transmission rate of the dimmable display.

11. The dimmable display lens system of claim 10, wherein the PID controller compares a measured feedback transmittance of the dimmable display to a requested transmittance of the dimmable display, and determines a transmittance error that is used to adjust a luminance of the dimmable display such that the emission of light from the display element is dimmed according to the requested transmittance.

12. The dimmable display lens system of claim 1, wherein the control system is configured to receive a user offset control or a user bias based on the plurality of light transmission incremental steps.

13. The dimmable display lens system of claim 1, wherein the ambient light sensor and the forward looking light sensor are logarithmic light sensors.

14. A method of controlling a dimmable display lens disposed in the direction of light emission of a display element, the method comprising:
setting the light emission of the display element to a constant value,
generating a look up table containing a plurality of light transmission incremental steps using a minimum transmission level of the dimmable display lens, a maximum transmission level of the dimmable display lens, a predetermined number of light transmission incremental steps;
selecting a light transmission incremental step from the look up table; and
adjusting the transmission of light emitted by the display element through the dimmable display lens according to the selected incremental step.

15. The method of claim 14, wherein the adjusting includes measuring ambient light to generate a transmission ratio lookup table and forward looking light to generate a luminance ratio table for transmission ratio table adaption control.

16. The method of claim 14, further comprising using a light source to project light through a segment of the dimmable display lens to a light sensor to measure the maximum transmission level.

17. The method of claim 14, further comprising estimating the maximum transmission level or determining the maximum transmission level during startup of the dimmable display lens and the display element.

18. A non-transient computer readable medium containing program instructions for causing a computer to perform the method of:
setting a light emission of a display element to a constant value;
generating a look up table containing a plurality of light transmission incremental steps using a minimum transmission level of the dimmable display lens, a maximum transmission level of the dimmable display lens, a predetermined number of light transmission incremental steps and a selected light transmission incremental step; and
adjusting the transmission of light emitted by the display element through the dimmable display lens according to the selected incremental step.

19. The computer readable medium of claim 18 further comprising instructions to perform the method of measuring ambient light to generate a transmission ratio lookup table and forward looking light to generate a luminance ratio table for transmission ratio table adaption control.

20. The computer readable medium of claim 18 further comprising instructions to perform the method of:
using a light source to project light through a segment of the dimmable display lens to a light sensor to measure the maximum transmission level; and estimating the maximum transmission level or determining the maximum transmission level during startup of the dimmable display lens and the display element.

* * * * *